United States Patent [19]

Sahley

[11] Patent Number: 4,973,467

[45] Date of Patent: Nov. 27, 1990

[54] DIETARY SUPPLEMENT FOR ADULTS

[75] Inventor: Billie J. Sahley, San Antonio, Tex.

[73] Assignee: Natrol, Inc., Chatsworth, Calif.

[21] Appl. No.: 421,138

[22] Filed: Oct. 13, 1989

[51] Int. Cl.⁵ .............................................. A61K 9/48
[52] U.S. Cl. .................................. 424/439; 424/451; 424/195.1; 514/904; 514/905; 426/72; 426/74
[58] Field of Search ..................... 424/439, 451, 195.1; 514/904, 905, 783; 426/74, 72

[56] References Cited

U.S. PATENT DOCUMENTS

| | | | |
|---|---|---|---|
| 3,962,416 | 6/1976 | Katzen | 424/439 |
| 4,156,013 | 5/1979 | Bruinvels et al. | 514/567 |
| 4,497,800 | 2/1985 | Larson et al. | 424/670 |
| 4,501,734 | 2/1985 | Tanaka et al. | 424/195.1 |
| 4,751,085 | 6/1988 | Gaull | 514/905 |
| 4,871,550 | 10/1989 | Millman | 514/905 |

*Primary Examiner*—Merrell C. Cashion, Jr.
*Assistant Examiner*—James M. Spear
*Attorney, Agent, or Firm*—Ashen, Martin, Seldon, Lippman & Scillieri

[57] ABSTRACT

A dietary supplement is provided for adults, consisting essentially of GABA (gamma-aminobutyric acid), L-tyrosine, Siberian ginseng, and vitamin B6.

3 Claims, No Drawings

DIETARY SUPPLEMENT FOR ADULTS

TECHNICAL FIELD

This invention is concerned with a special blend of amino acids and Vitamin B6 which has been designed to help an adult live a normal, active lifestyle. The blend may also contain other amino acids, vitamins, and/or minerals.

RELATED APPLICATION

This application is related to my copending application Serial No. 07/421 016 filed concurrently herewith and entitled "Dietary Supplement For Children" and disclosing another dietary mixture of amino acids and Vitamin B6, especially designed for children.

BACKGROUND ART

Dietary imbalance is known to cause physiological disorders in humans, such as stress and anxiety. Researchers have shown that, in many cases, these problems can be treated by orthomolecular therapy. Orthomolecular therapy is the treatment of a condition in a patient by varying the concentration of substances normally present in the human bodies. These substances, which are referred to as "the right molecules", are vitamins, minerals, trace elements, hormones, amino acids, and enzymes. Regulation of the concentration of these molecules in the body helps in the achievement and preservation of optimum health and the prevention and treatment of disease. If the level of any of "the right molecules" in a person's system is low, it can produce a disturbed biochemical homeostasis, which, in turn, can bring on an attack of anxiety. On the other hand, many people who suffered from anxiety and phobia have maintained control when taking GABA (gamma-aminobutyric acid) with inositol and niacinamide without any tranquilizers. Of this group, a large percentage had at one time been on tranquilizers.

Various dietary supplements have been used in the past with patients who have shown symptoms of anxiety or stress. One of the best of these supplements is sold by NATROL, INC., Chatsworth, Calif. Four capsules of the product is the recommended daily dosage and contain:

|  |  | USRDA* |
|---|---|---|
| Niacinamide | 200 mg | 1000% |
| Vitamin C | 60 mg | 100% |
| Vitamin B12 | 6 mcg. | 100% |
| Vitamin B6 | 2 mg | 100% |
| Vitamin B2 | 1.7 mg | 100% |
| Vitamin B1 | 1.5 mg | 100% |
| Magnesium | 100 mg | 25% |
| GABA | 500 mg |  |
| L-Tyrosine | 500 mg |  |
| Valerian Root | 50 mg |  |
| Siberian Ginseng | 50 mg |  |
| Inositol | 200 mg |  |

*Percent U.S. Recommended Daily Allowance.

DISCLOSURE OF INVENTION

A dietary supplement is provided for adults, consisting essentially of GABA (gamma-aminobutyric acid), L-tyrosine, Siberian ginseng, and vitamin B6.

BEST MODES FOR CARRYING OUT THE INVENTION

I have discovered an improved nutritional formula. The formulation consists essentially of the following, parts by wt:

| GABA | from about 40 to 50 |
|---|---|
| L-Tyrosine | from about 40 to 50 |
| Siberian Ginseng | from about 5 to 10, and |
| Vitamin B6 | from about 0.2 to 0.4. |

Other amino acids, vitamins, and minerals may be included. For instance, inositol, vitamin C (especially as Ester C ®), thiamine, riboflavin, niacin, and magnesium (especially s magnesium oxide) are valuable additions. (ESTER is a registered trademark of Inter-Cal Corp. This form is superior to regular ascorbic acid and delivers four times the normal amount to the system.)

The new composition is preferably put into capsules, along with other "right molecules" so that four capsules, which would be the recommended daily dose for an adult, will contain the following:

| GABA | 585 to 715 mg |  |
|---|---|---|
| L-Tyrosine | 585 to 715 mg |  |
| Siberian Ginseng | 90 to 110 mg |  |
| Inositol | 90 to 110 mg |  |
|  |  | USRDA* |
| Vitamin C (as Ester C ®) | 90 to 110 mg | 150 to 175% |
| Thiamine (Vitamin B1) | 2.7 to 3.3 mg | 180 to 220% |
| Riboflavin (Vitamin B2) | 2.7 to 3.4 mg | 165 to 195% |
| Niacin (Niacinamide) | 45 to 55 mg | 225 to 275% |
| Vitamin B6 | 3.5 to 4.5 mg | 180 to 220% |
| Magnesium | 90 to 110 mg | 22.5 to 27.5% |

*Percent U.S. Recommended Daily Allowance.

A preferred formulation contains the following in four capsules:

| GABA | 650 mg |  |
|---|---|---|
| L-Tyrosine | 650 mg |  |
| Siberian Ginseng | 100 mg |  |
| Inositol | 100 mg |  |
|  |  | USRDA* |
| Vitamin C (as Ester C ®) | 100 mg | 166.6% |
| Thiamine | 3 mg | 200% |
| Riboflavin | 3.1 mg | 182.4% |
| Niacin | 50 mg | 250% |
| Vitamin B6 | 4 mg | 200% |
| Magnesium | 100 mg | 25% |

GABA is gamma-aminobutyric acid. According to a 1982 publication in *Life Extension* by Sandy Shaw and Durk Pearson, it mimics the tranquilizing effect of Valium and Librium but without the sedation associated with those drugs. A report in the Aug. 14, 1982 issue of *Lancet* stated that GABA is a major inhibitory transmitter in the mammalian central nervous system. GABA works well with other amino acids in hyperactive children.

L-tyrosine is useful in overcoming depression, improving memory and increasing mental alertness, according to recent clinical findings. L-tyrosine is needed to build many complex proteins and enzymes. By minor alteration of the molecule in the body, L-tyrosine is converted to compounds that are called neurotransmitters. The conversion proceeds from L-tyrosine to dopa to dopamine to norepinephrine to epinephrine. An article in the American Journal of Psychiatry (1980) by Dr. Alan J. Gelenberg reported tremendous improvement in patients suffering from long standing depression after two weeks of daily intakes of 100 mg per day of an L-tyrosine supplement.

Siberian Ginseng has been called the state-of-the-art in herbal therapeutics. Research shows that it has been used in China, Korea, and India for over 5,000 years.

Vitamin B6 (pyridoxine) is the most important vitamin for amino acid metabolism because it is the cofactor for the enzymes called transamines, which metabolize amino acids.

Niacinamide assists in the production of tryptophan which is known as a natural relaxant. It is part of the B complex group known as the stress fighters.

In the treatment of hyperactivity, vitamin C is important. A study in 1987 showed that Ester C is neutral and is four times more bioavailable than ordinary vitamin C.

Magnesium is involved in many essential metabolic processes, and it helps in the absorption of other minerals. It is necessary for the proper functioning of the nerves, and it acts as a relaxant.

The compositions and capsules of this invention may include pharmaceutically acceptable inerts, such as calcium carbonate and magnesium stearate.

When adults who are exhibiting symptoms of anxiety or stress are provided a dietary supplement of approximately four capsules a day containing the above formulation in the indicated levels, about 60% of them are able to function normally without addictive medication.

I claim:

1. A dietary composition consisting essentially of the following parts by weight:
GABA from about 40 to 50,
L-Tyrosine from about 40 to 50,
Siberian Ginseng from about 5 to 10, and
Vitamin B6 from about 0.2 to 0.4.

2. A dietary composition in capsule form such that four capsules contain

| GABA | 585 to 715 mg |
|---|---|
| L-Tyrosine | 585 to 715 mg |
| Siberian Ginseng | 90 to 110 mg |
| Inositol | 90 to 110 mg |
| Vitamin C as ESTER C ® | 90 to 110 mg |
| Thiamine (Vitamin B1) | 2.7 to 3.3 mg |
| Riboflavin (Vitamin B2) | 2.7 to 3.4 mg |
| Niacin (Niacinamide) | 45 to 55 mg |
| Vitamin B6 | 3.5 to 4.5 mg |
| Magnesium | 90 to 110 mg |

3. A dietary composition in capsule form such that four capsules contain

| GABA | 650 mg |
|---|---|
| L-Tyrosine | 650 mg |
| Siberian Ginseng | 100 mg |
| Inositol | 100 mg |
| Vitamin C as ESTER C ® | 100 mg |
| Thiamine | 3 mg |
| Riboflavin | 3.1 mg |
| Niacin | 50 mg |
| Vitamin B6 | 4 mg |
| Magnesium | 100 mg |

* * * * *